United States Patent
Maaref et al.

(10) Patent No.: US 10,813,043 B2
(45) Date of Patent: Oct. 20, 2020

(54) SYSTEM AND METHOD FOR COMMUNICATING WIRELESS TRANSMISSIONS SPANNING BOTH LICENSED AND UN-LICENSED SPECTRUM

(71) Applicant: Huawei Technologies Co., Ltd., Shenzhen (CN)

(72) Inventors: Amine Maaref, Kanata (CA); Mohamed Adel Salem, Kanata (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 50 days.

(21) Appl. No.: 14/669,333

(22) Filed: Mar. 26, 2015

(65) Prior Publication Data
US 2015/0334642 A1 Nov. 19, 2015

Related U.S. Application Data

(60) Provisional application No. 61/994,734, filed on May 16, 2014.

(51) Int. Cl.
*H04W 4/00* (2018.01)
*H04W 48/18* (2009.01)
(Continued)

(52) U.S. Cl.
CPC .......... *H04W 48/18* (2013.01); *H04B 1/0003* (2013.01); *H04L 5/0007* (2013.01);
(Continued)

(58) Field of Classification Search
CPC . H04W 88/02; H04W 72/0413; H04W 88/08; H04W 72/0453; H04W 5/0048
(Continued)

(56) References Cited

U.S. PATENT DOCUMENTS

| | | | |
|---|---|---|---|
| 2,649,768 A | * | 8/1953 | Anderson ................. E03B 9/14 137/304 |
| 7,512,094 B1 | | 3/2009 | Linebarger et al. |

(Continued)

FOREIGN PATENT DOCUMENTS

| | | |
|---|---|---|
| CN | 101345679 A | 1/2009 |
| CN | 101616419 A | 12/2009 |

(Continued)

OTHER PUBLICATIONS

International Search Report and Written Opinion received in International Application No. PCT/CN2015/077813 dated Aug. 5, 2015, 10 pages.

(Continued)

*Primary Examiner* — Atique Ahmed
(74) *Attorney, Agent, or Firm* — Slater Matsil, LLP

(57) ABSTRACT

Performing wireless transmissions over a unified air interface that span portions of both the primary band and the complementary band may provide improved throughput and spectral efficiency in next generation networks. Wireless transmissions spanning both the licensed and unlicensed spectrum carry data in different frame formats over the respective primary and complementary bands. For example, frames communicated over the primary band may have a different channel structure (e.g., different size, placement, orientation, etc.) than frames communicated over the complementary band. Wireless transmissions spanning the licensed and unlicensed spectrum may also utilize different access schemes and/or waveforms over the respective primary and complementary bands. Embodiment unified air interfaces may be dynamically configurable via software defined radio (SDR) signaling instructions.

31 Claims, 6 Drawing Sheets

(51) Int. Cl.
*H04L 5/00* (2006.01)
*H04L 27/26* (2006.01)
*H04B 1/00* (2006.01)
*H04W 72/04* (2009.01)
*H04W 88/10* (2009.01)
*H04W 28/18* (2009.01)
*H04W 16/14* (2009.01)
*H04W 88/06* (2009.01)

(52) U.S. Cl.
CPC .......... *H04L 5/0094* (2013.01); *H04L 27/264* (2013.01); *H04W 16/14* (2013.01); *H04W 28/18* (2013.01); *H04W 72/0446* (2013.01); *H04W 88/10* (2013.01); *H04L 5/001* (2013.01); *H04L 5/0037* (2013.01); *H04L 5/0062* (2013.01); *H04W 88/06* (2013.01)

(58) Field of Classification Search
USPC ........................................................ 370/329
See application file for complete search history.

(56) References Cited

U.S. PATENT DOCUMENTS

| | | | |
|---|---|---|---|
| 7,590,093 B1 | 9/2009 | Goyal et al. | |
| 8,126,473 B1 | 2/2012 | Kim et al. | |
| 8,428,038 B1 | 4/2013 | Buttles | |
| 8,442,066 B2 | 5/2013 | Jeon et al. | |
| 9,264,846 B2 | 2/2016 | Stromberg et al. | |
| 2004/0013089 A1 | 1/2004 | Taneja et al. | |
| 2004/0203815 A1* | 10/2004 | Shoemake | H04W 72/02 455/450 |
| 2006/0056365 A1 | 3/2006 | Das et al. | |
| 2006/0251026 A1 | 11/2006 | Kalhan | |
| 2006/0281404 A1 | 12/2006 | Lee et al. | |
| 2007/0026868 A1 | 2/2007 | Schulz et al. | |
| 2007/0133482 A1* | 6/2007 | Grannan | H04W 16/14 370/338 |
| 2007/0275657 A1 | 11/2007 | Chang et al. | |
| 2008/0039089 A1 | 2/2008 | Berkman et al. | |
| 2008/0069242 A1 | 3/2008 | Xu et al. | |
| 2008/0112467 A1 | 5/2008 | Shellhammer | |
| 2008/0161035 A1* | 7/2008 | Tomioka | H04W 16/14 455/550.1 |
| 2008/0176518 A1 | 7/2008 | Pascht et al. | |
| 2008/0220787 A1 | 9/2008 | Stanwood et al. | |
| 2008/0298275 A1 | 12/2008 | De Sousa | |
| 2009/0073924 A1 | 3/2009 | Chou | |
| 2009/0092105 A1 | 4/2009 | Chou | |
| 2009/0109921 A1 | 4/2009 | Bowen | |
| 2009/0175214 A1 | 7/2009 | Sfar et al. | |
| 2009/0258607 A1 | 10/2009 | Beninghaus et al. | |
| 2010/0184435 A1 | 7/2010 | Shellhammer et al. | |
| 2010/0227606 A1 | 9/2010 | Nan et al. | |
| 2010/0260266 A1 | 10/2010 | Gholmieh et al. | |
| 2011/0028102 A1 | 2/2011 | Li et al. | |
| 2011/0158096 A1 | 6/2011 | Leung et al. | |
| 2011/0165896 A1 | 7/2011 | Stromberg et al. | |
| 2011/0176478 A1 | 7/2011 | Inohiza | |
| 2011/0206054 A1* | 8/2011 | Pajjuri | H04W 36/14 370/401 |
| 2011/0237238 A1 | 9/2011 | Hassan et al. | |
| 2011/0243060 A1 | 10/2011 | Mildh et al. | |
| 2011/0286343 A1 | 11/2011 | Powell et al. | |
| 2011/0305189 A1 | 12/2011 | Chen et al. | |
| 2012/0039284 A1 | 2/2012 | Barbieri et al. | |
| 2012/0077510 A1* | 3/2012 | Chen | H04W 28/26 455/452.1 |
| 2012/0134328 A1 | 5/2012 | Gauvreau et al. | |
| 2012/0250631 A1* | 10/2012 | Hakola | H04L 5/001 370/329 |
| 2013/0016221 A1 | 1/2013 | Charbit et al. | |
| 2013/0023202 A1 | 1/2013 | Koskela et al. | |
| 2013/0059594 A1 | 3/2013 | Hui et al. | |
| 2013/0064198 A1 | 3/2013 | Krishnaswamy et al. | |
| 2013/0077501 A1 | 3/2013 | Krishnaswamy et al. | |
| 2013/0143541 A1 | 6/2013 | Henderson et al. | |
| 2013/0155991 A1 | 6/2013 | Kazmi et al. | |
| 2013/0156005 A1 | 6/2013 | Li et al. | |
| 2013/0165134 A1 | 6/2013 | Touag et al. | |
| 2013/0255991 A1 | 6/2013 | Kazmi et al. | |
| 2013/0176934 A1 | 7/2013 | Malladi et al. | |
| 2013/0188552 A1 | 7/2013 | Kazmi et al. | |
| 2013/0244666 A1 | 9/2013 | Carmon et al. | |
| 2013/0286834 A1 | 10/2013 | Lee | |
| 2013/0295946 A1* | 11/2013 | Panchal | H04W 16/14 455/452.1 |
| 2013/0295948 A1 | 11/2013 | Ye et al. | |
| 2013/0311673 A1 | 11/2013 | Karthikeyan et al. | |
| 2013/0337821 A1 | 12/2013 | Clegg | |
| 2013/0343288 A1* | 12/2013 | Ratasuk | H04W 72/1215 370/329 |
| 2014/0016570 A1 | 1/2014 | Ma et al. | |
| 2014/0016620 A1* | 1/2014 | Singh | H04L 5/0078 370/336 |
| 2014/0023022 A1* | 1/2014 | Cheng | H04L 5/0005 370/329 |
| 2014/0031054 A1* | 1/2014 | Zou | H04W 16/14 455/452.2 |
| 2014/0043979 A1 | 2/2014 | Etemad et al. | |
| 2014/0050086 A1 | 2/2014 | Himayat et al. | |
| 2014/0051467 A1 | 2/2014 | Tan et al. | |
| 2014/0092828 A1 | 4/2014 | Sirotkin | |
| 2014/0105115 A1 | 4/2014 | Ohayon et al. | |
| 2014/0169261 A1 | 6/2014 | Ming et al. | |
| 2014/0189091 A1 | 7/2014 | Tamasi et al. | |
| 2014/0233437 A1* | 8/2014 | Abdoli | H04L 5/0007 370/280 |
| 2014/0233472 A1 | 8/2014 | Kadel | |
| 2014/0269550 A1 | 9/2014 | Webb | |
| 2014/0282754 A1 | 9/2014 | Rehman et al. | |
| 2014/0287769 A1* | 9/2014 | Taori | H04W 74/0808 455/450 |
| 2014/0294118 A1 | 10/2014 | Baik et al. | |
| 2014/0307552 A1* | 10/2014 | Elsherif | H04W 72/1215 370/235 |
| 2015/0009869 A1 | 1/2015 | Clegg | |
| 2015/0009962 A1 | 1/2015 | Clegg | |
| 2015/0011226 A1 | 1/2015 | De Sousa | |
| 2015/0016318 A1 | 1/2015 | Lee et al. | |
| 2015/0023315 A1* | 1/2015 | Yerramalli | H04W 72/042 370/330 |
| 2015/0049712 A1* | 2/2015 | Chen | H04W 72/04 370/329 |
| 2015/0049741 A1* | 2/2015 | Chen | H04W 56/0005 370/336 |
| 2015/0067541 A1 | 3/2015 | Karande et al. | |
| 2015/0085741 A1 | 3/2015 | Sfar et al. | |
| 2015/0117468 A1 | 4/2015 | Shin et al. | |
| 2015/0131536 A1* | 5/2015 | Kaur | H04L 5/001 370/329 |
| 2015/0146615 A1 | 5/2015 | Yu et al. | |
| 2015/0172931 A1 | 6/2015 | Jose et al. | |
| 2015/0188665 A1 | 7/2015 | Chen et al. | |
| 2015/0189652 A1 | 7/2015 | Mizusawa | |
| 2015/0215133 A1 | 7/2015 | Cao et al. | |
| 2015/0237628 A1 | 8/2015 | Nerella et al. | |
| 2015/0264702 A1 | 9/2015 | Yang et al. | |
| 2015/0289270 A1 | 10/2015 | Knapp et al. | |
| 2015/0304146 A1* | 10/2015 | Yang | H04L 5/0066 370/329 |
| 2015/0319753 A1 | 11/2015 | Chen et al. | |
| 2015/0334599 A1 | 11/2015 | Maaref et al. | |
| 2015/0334643 A1 | 11/2015 | Maaref et al. | |
| 2015/0334712 A1 | 11/2015 | Maaref et al. | |
| 2016/0112157 A1 | 4/2016 | Li et al. | |
| 2016/0135143 A1 | 5/2016 | Won et al. | |
| 2016/0285537 A1 | 9/2016 | Maaref et al. | |
| 2016/0295477 A1 | 10/2016 | Zhu | |
| 2016/0353287 A1 | 12/2016 | Hassan et al. | |

(56) References Cited

U.S. PATENT DOCUMENTS

| | | | |
|---|---|---|---|
| 2017/0118758 | A1 | 4/2017 | Li et al. |
| 2018/0199280 | A1 | 7/2018 | Griot et al. |

FOREIGN PATENT DOCUMENTS

| | | | |
|---|---|---|---|
| CN | 101682530 | A | 3/2010 |
| CN | 101820632 | A | 9/2010 |
| CN | 102474727 | A | 5/2012 |
| CN | 102907153 | | 1/2013 |
| CN | 102917448 | A | 2/2013 |
| CN | 103188711 | A | 7/2013 |
| CN | 103327552 | A | 9/2013 |
| CN | 103370896 | A | 10/2013 |
| CN | 103441779 | A | 12/2013 |
| CN | 104041174 | A | 9/2014 |
| EP | 1545144 | A1 | 6/2005 |
| EP | 2741547 | B1 | 9/2018 |
| JP | 2009246875 | A | 10/2009 |
| JP | 2010505324 | A | 2/2010 |
| JP | 2012516108 | A | 7/2012 |
| JP | 2013062830 | A | 4/2013 |
| JP | 2013534395 | A | 9/2013 |
| JP | 2014500685 | A | 1/2014 |
| JP | 2014502799 | A | 2/2014 |
| JP | 2014207673 | A | 10/2014 |
| KR | 20130126816 | A | 11/2013 |
| KR | 20140017517 | A | 2/2014 |
| KR | 20140025435 | A | 3/2014 |
| RU | 2414050 | C2 | 3/2011 |
| RU | 2442288 | C2 | 2/2012 |
| RU | 2449483 | C2 | 4/2012 |
| RU | 2012141029 | A | 3/2014 |
| RU | 2649768 | C1 | 4/2018 |
| WO | 0064106 | A1 | 10/2000 |
| WO | 2010077631 | A1 | 7/2010 |
| WO | 2011162983 | A1 | 12/2011 |
| WO | 2012039656 | A1 | 3/2012 |
| WO | 2012058823 | A1 | 5/2012 |
| WO | 2012078565 | A1 | 6/2012 |
| WO | 2012144801 | A2 | 10/2012 |
| WO | 2012171931 | A1 | 12/2012 |
| WO | 2013103754 | | 7/2013 |
| WO | 2013103754 | A1 | 7/2013 |
| WO | 2013162615 | A1 | 10/2013 |
| WO | 2014027496 | | 2/2014 |
| WO | 2014066403 | A1 | 5/2014 |
| WO | 2014070394 | A1 | 5/2014 |

OTHER PUBLICATIONS

International Search Report and Written Opinion received in International Application No. PCT/CN2015/079076 dated Aug. 19, 2015, 11 pages.
International Search Report and Written Opinion received in International Application No. PCT/CN2015/078962 dated Aug. 20, 2015, 11 pages.
LTE, 3rd Generation Partnership Project; Technical Specification Group Services and System Aspects; Multimedia Broadcast/ Multicase Service (MBMS); Protocols and Codecs (Release 13), 3GPP TS 26.346 v13.0.0, Mar. 2015, 207 pages.
Byers, J.W., et al., "A Digital Fountain Approach to Reliable Distribution of Bulk Data," (date unknown), 15 pages.
Kushwaha, H., et al., "Reliable Multimedia Transmission Over Cognitive Radio Networks Using Fountain Codes," Proceedings of the IEEE, vol. 96, No. 1, Jan. 2008, 11 pages.
Luby, Michael G., et al., "Efficient Erasure Correcting Codes," IEEE Transactions of Information Theory, vol. 47, No. 2, Feb. 2001, pp. 569-584.
Luby, Michael, "LT Codes," Proceedings of the 43rd Annual IEEE Symposium on Foundations of Computer Science (FOCS '02), 2002, 10 pages.
Shokrollahi, Amin, "Raptor Codes," IEEE Transactions of Information Theory, vol. 52, No. 6, Jun. 2006, pp. 2551-2567.
"New SID: Study on Licensed-Assisted Access using LTE," 3GPP TSG RAN Meeting #63, RP-140481, Fukuoka, Japan, Mar. 3-6, 2014, 8 pages.
Dikmese, Sener et al., "Spectrum sensing and resource allocation for multicarrier cognitive radio systems under interference and power constraints," EURASIP Journal of Advances in Signal Processing, 2014, May 12, 2014, 12 pages.
"New SID: Study on Licensed-Assisted Access using LTE", 3GPP TSG RAN Meeting #63, RP-140240, Fukuoka, Japan, Mar. 3-6, 2014, 8 pages.
Ericsson et al., "Study on Licensed-Assisted Access Usings LTE", 3GPP TSG RAN, Meeting #63, RP-140260, Mar. 2014, 8 pages, Fukuoka, Japan.
Huawei et al., "Motivation of the New SI Proposal: Study on Licensed-Assisted Access using LTE", 3GPP TSG RAN Meeting #63, RP-140214, Mar. 2014, 9 Pages, Fukuoka, Japan.
IEEE Standard for Information technology—Telecommunications and information exchange between stystems—Local and metropolitan area networks—Specific requirements, Part 11: Wireless LAN Medium Access Control (MAC) and Physical Later (PHY) Specifications, Amendment 5 : Enhancements for Higher Throughput, IEEE Computer Society, 802.11n, Oct. 2009, 536 Pages.
IEEE Standard for Lcoal and metroplitan area networks, Part 16: Air Interface for Broadband Wireless Access Systems, IEEE Computer Society and IEEE Microwave Theory and Techniques Society, 802.16, May 2009, 2082 Pages.

* cited by examiner

SYSTEM AND METHOD FOR COMMUNICATING WIRELESS TRANSMISSIONS SPANNING BOTH LICENSED AND UN-LICENSED SPECTRUM

This patent application claims priority to U.S. Provisional Application No. 61/994,734, filed on May 16, 2014 and entitled "System and Method for Integrated Licensed-Unlicensed QoS-Driven Spectrum Access," which is hereby incorporated by reference herein as if reproduced in its entirety.

TECHNICAL FIELD

The present invention relates generally to managing the allocation of resources in a network, and in particular embodiments, to systems and methods for communicating wireless transmissions spanning both licensed and un-licensed spectrum.

BACKGROUND

Governmental bodies reserve bands of wireless spectrum for different uses. For example, the Federal Communications Commission (FCC), the International Telecommunication Union (ITU), and other regulatory agencies reserve some portions of the spectrum for licensed activities (e.g., radio, television, satellite, mobile telecommunication, etc.), while reserving other portions of the spectrum for unlicensed activities. The licensed spectrums may be subject to regulations set forth by the regulatory agency, as well as to operating protocols agreed upon by the public and/or private entities engaging in the licensed activity. The spectrum reserved for unlicensed communications may also be subject to regulations set forth by the corresponding regulatory agency, particularly with regards to transmission power and shared access.

SUMMARY OF THE INVENTION

Technical advantages are generally achieved, by embodiments of this disclosure which describe systems and methods for communicating wireless transmissions spanning both licensed and un-licensed spectrum.

In accordance with an embodiment, a method for facilitating wireless communications spanning licensed and unlicensed bands is provided. In this example, the method includes selecting configuration parameters for communicating wireless signals over multiple bands in accordance with a unified air interface. The selected configuration parameters include a first set of configuration parameters for communicating wireless signals over a primary band licensed for cellular communications, and a second set of configuration parameters for communicating wireless signals over a complementary band reserved for unlicensed communications. The method further includes prompting a transmit point to perform a wireless transmission over the unified air interface in accordance with the selected configurations parameters. Portions of the wireless transmission spanning the primary band are communicated in accordance with the first set of configuration parameters, and portions of the wireless transmission spanning the complementary band are communicated in accordance with the second set of configuration parameters. An apparatus for performing this method is also provided.

In accordance with another embodiment, a method for transmitting a signal spanning licensed and unlicensed bands is provided. In this example, the method includes establishing a unified air interface between a transmit point and one or more receive points, and performing a wireless transmission over the unified air interface spanning at least a portion of a primary band and at least a portion of a complementary band. The primary band is licensed for cellular operations, and the complementary band is reserved for unlicensed communications. An apparatus for performing this method is also provided.

In accordance with yet another embodiment, a method for operating a multi-spectrum receiver is provided. In this example, the method includes establishing a unified air interface between a transmit point and a receive point, and receiving a wireless transmission over the unified air interface spanning at least a portion of a primary band and at least a portion of a complementary band. The primary band is licensed for cellular operations, and the complementary band is reserved for unlicensed communications. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless other-

DETAILED DESCRIPTION OF ILLUSTRATIVE EMBODIMENTS

Figure 1:
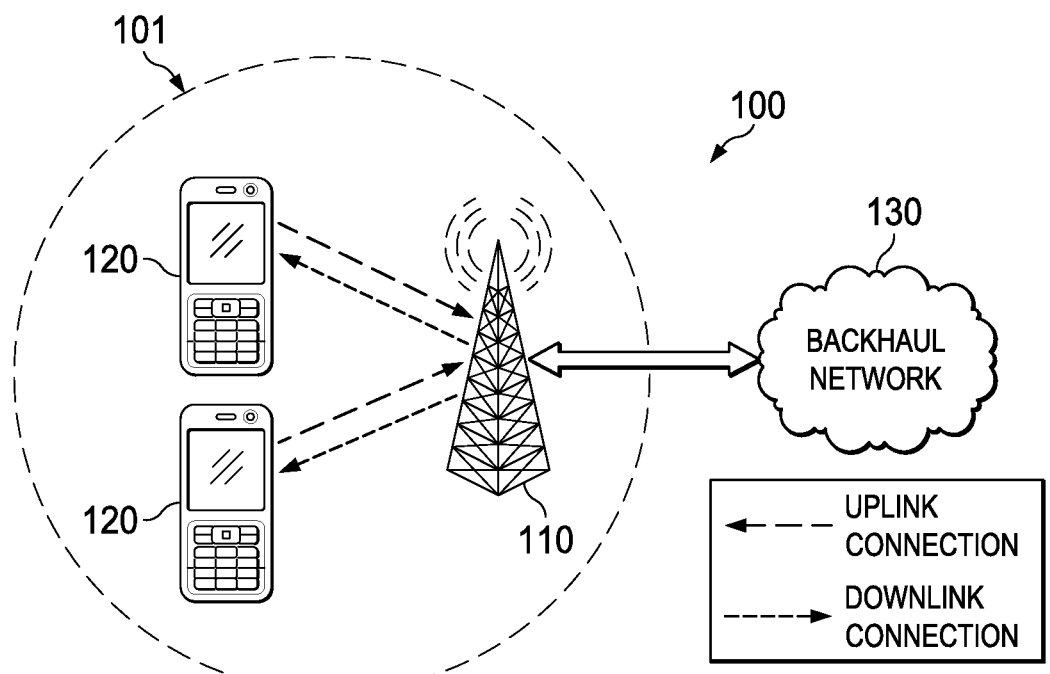
FIG. 1 illustrates a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Many wireless telecommunication protocols, such as the long term evolution (LTE) advanced (LTE-A) protocol, operate exclusively in frequency bands licensed for cellular communications, which are collectively referred to as the "primary band" throughout this disclosure. Other wireless telecommunications protocols, such as Wi-Fi protocol, operate exclusively in the unlicensed band, which is referred to as the "complementary band" throughout this disclosure. The term "licensed band" may be used interchangeably with the term "primary band," and the term "unlicensed band" may be used interchangeably with the term "complementary band." Notably, the frequency bands licensed for cellular transmission may change from time to time, and the term "primary band" may also refer to frequency bands that are re-licensed for cellular transmission after the filing of this application. The complementary band may include spectrums reserved for non-telecom purposes, such as the industrial, scientific and medical (ISM) band. Telecommunication protocols operating over the primary band often provide more reliable data transmissions, while telecommunication protocols operating over the complementary band are often capable of supporting low latency high volume transmissions, albeit with reduced reliability.

Aspects of this disclosure provide techniques for performing a wireless transmission over a unified air interface that spans portions of both the primary band (e.g., licensed spectrum) and the complementary band (e.g., unlicensed spectrum). In some embodiments, wireless transmissions spanning both the licensed and unlicensed spectrum carry data in different frame formats over the respective primary and complementary bands. For example, frames communicated over the primary band may have a different channel structure (e.g., different size, placement, orientation, etc.) than frames communicated over the complementary band. In other embodiments, wireless transmissions spanning the licensed and unlicensed spectrum utilize different access schemes over the respective primary and complementary bands. For instance, subscribers may access scheduled or grant-based resources when communicating over the primary band, while accessing contention-based or grant-less resources when communicating over the complementary band. Hence, a single wireless transmission may transport data over grant-based resources of the primary band and over grant-less resources of the complementary band. In other embodiments, wireless transmissions spanning the licensed and unlicensed spectrum use different waveforms to transport data over the respective primary and complementary bands. For example, a wireless transmission may use an orthogonal frequency orthogonal frequency-division multiplexing (OFDM) waveform to transport data over the primary band, while using a filter bank multi-carrier (FBMC) waveform to transport data over the complementary band. In some embodiments, unified air interfaces adapted to transport wireless transmissions over the licensed and unlicensed spectrum are dynamically configurable/re-configured via software defined radio (SDR) signaling instructions. For example, a controller may signal an SDR instruction to a transmit point or a receive point to manipulate transmission parameters used to communicate traffic over the primary band, the complementary band, or both. These and other details are described in greater detail below.

As used to herein, the term "unified air interface" refers to an air interface sharing a common physical and medium access control (MAC) connection, as may be consistent with an interface operating in accordance with a common radio access technology (RAT), such as a cellular radio access network (RAN) in an fifth generation (5G) LTE system. In some embodiments, a unified air interface includes at least two spectrum-type dependent air interface configurations, including one air interface configuration for a primary band licensed for cellular communication, and one air interface configuration for a complementary band reserved for unlicensed communication.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2:
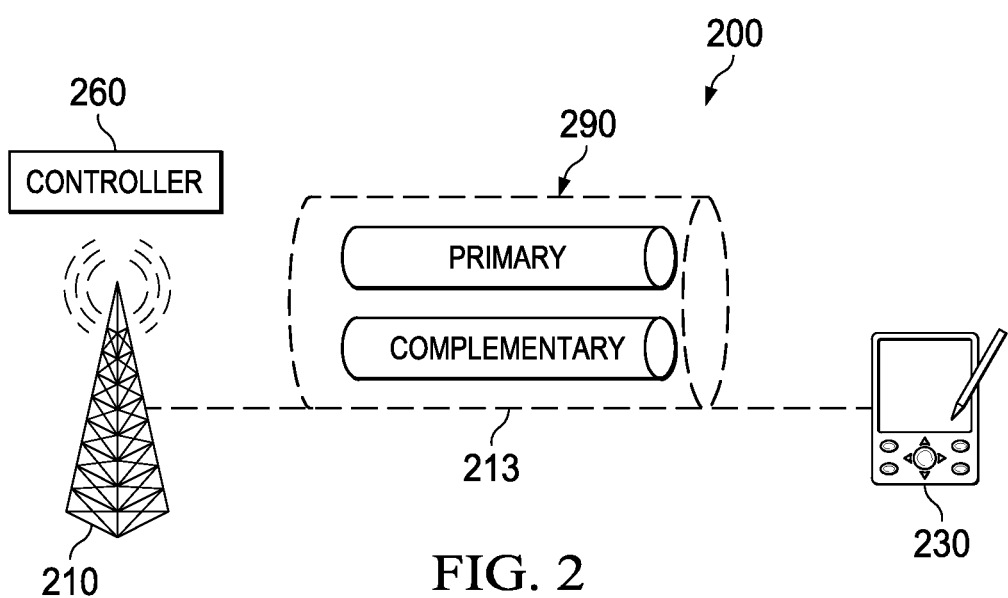
FIG. 2 illustrates a diagram of an embodiment wireless network adapted to transport wireless transmissions spanning portions of both the primary and complementary spectrums over an adaptable air interface.

Aspects of this disclosure provide a unified air interface between a transmit point and a receive point that is configured to transport wireless transmissions spanning portions of both the primary and complementary spectrums. The unified air interface may extend from a transmit point to a single receive point or from a transmit point to multiple receive points. In one example, the adaptive interface is established between a base station and a user equipment. FIG. 2 illustrates an embodiment wireless network 200 adapted for communicating wireless transmissions spanning portions of both the primary and complementary spectrums. As shown, the wireless network 200 comprises a base station 210, a user equipment (UE) 230, and a controller 260. A unified air interface 213 is established between the base station 210 and the UE 230, and is adapted to carry a wireless transmission 290 that spans at least a portion of the primary band and a portion of the complementary band. In one embodiment, the wireless transmission 290 is a downlink signal communicated from the base station 210 to the UE 230. In another embodiment, the wireless transmission 290 is an uplink signal communicated from the UE 230 to the base station 210. The wireless transmission 290 may also have different transmission formats/characteristics. For example, the wireless transmission 290 may be a unicast transmission, a multi-cast transmission, or a broadcast transmission. As another example, the wireless transmission may include single-layer signaling and/or multi-layer signaling communicated from a single antenna or from multiple antennas, e.g., single-user (SU) multiple input multiple output (MIMO) transmissions, multi-user MIMO transmissions, etc.

The controller 260 may be a control plane entity adapted to control or facilitate multi-band transmissions over the unified air interface 213. For example, the controller 260 may be a scheduler adapted to statically, semi-statically, or dynamically schedule traffic over the unified air interface 213. As another example, the controller 260 may be a traffic engineering (TE) controller adapted to statically, semi-statically, or dynamically distribute policies to the base station 210 and/or the UE 230. As yet another example, the controller 260 may be adapted to dynamically re-configure the unified air interface 213 by communicating SDR signaling instructions to the base station 210 and/or the UE 230. In one embodiment, the controller 260 signals SDR instructions that configure the unified air interface to transport traffic over the respective primary and complementary bands in accordance with different transmission parameters, e.g., different frame formats, different waveforms, different access schemes, etc.

The controller 260 may schedule traffic having deterministic QoS constraints over the primary band, and schedule traffic having statistical QoS constraints over the complementary band when the complementary band is capable of satisfying the statistical QoS constraints of the traffic. As discussed herein, a "deterministic QoS constraint" requires that every packet in a traffic flow be communicated in a manner that satisfies a QoS requirement, while a "statistical QoS constraint" can be satisfied even if some packets (e.g., a fraction of the total packets) are communicated in a manner that violates a QoS requirement. For example, a deterministic latency requirement is satisfied when each packet in the flow is communicated within a delay bound. Conversely, a statistical latency requirement may be satisfied when a certain percentage of the packets are communicated within a delay bound.

Figure 3:
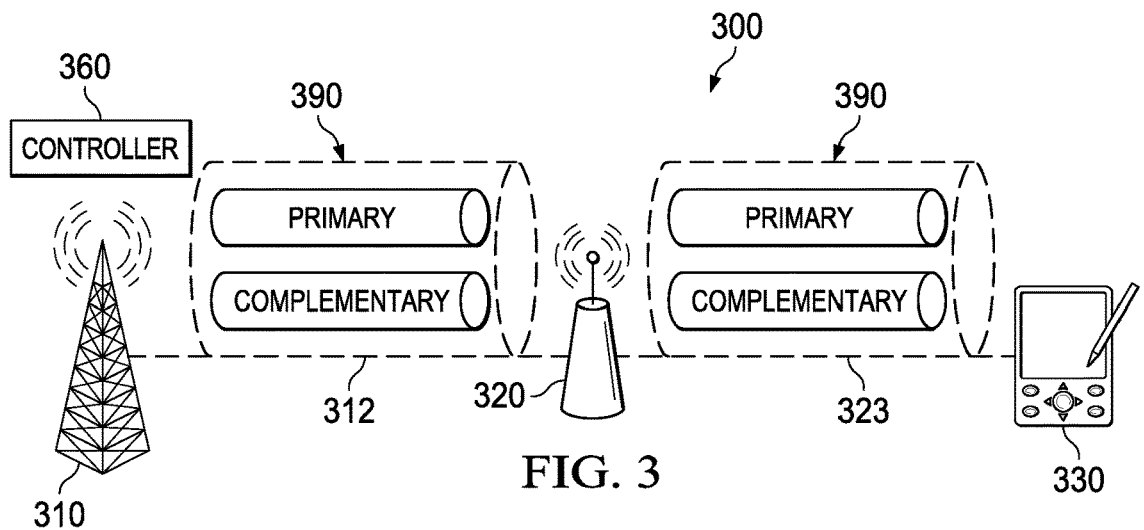
FIG. 3 illustrates a diagram of another embodiment wireless network adapted to transport wireless transmissions spanning portions of both the primary and complementary spectrums over an adaptable air interface.

Embodiment adaptive interfaces may also be established between a relay station and another device, e.g., a base station, a UE, another relay, etc. FIG. 3 illustrates another embodiment wireless network 300 adapted for communicating wireless transmissions spanning portions of both the primary and complementary spectrums. As shown, the wireless network 300 comprises a base station 310, a relay station 320, a UE 330, and a controller 360. Air interfaces 312, 323 are established between the relay station 320 and the base station 310 and between the relay station 320 and the UE 330, respectively. One or both of the air interfaces 312, 323 may be unified air interface adapted to carry wireless transmissions 390 spanning both the primary band and the complementary band. The controller 360 may be configured similarly to the controller 260. For example, the controller 360 may schedule traffic over the air interface 312 and/or the air interface 323. As another example, the controller 360 may signal SDN instructions to dynamically reconfigure the air interface 312 and/or the air interface 323.

Figure 4:
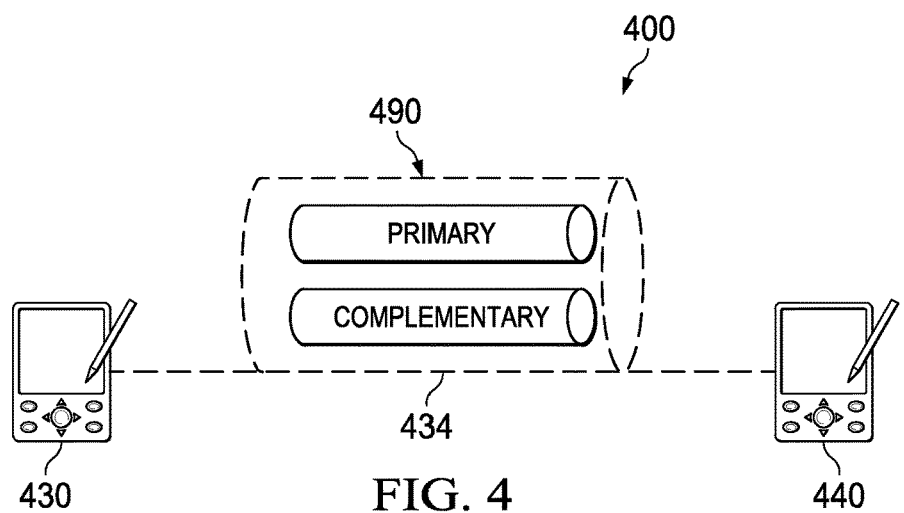
FIG. 4 illustrates a diagram of yet another embodiment wireless network adapted to transport wireless transmissions spanning portions of both the primary and complementary spectrums over an adaptable air interface.

Embodiment adaptive interfaces may also be established between a pair of UEs, e.g., as a direct device-to-device (D2D) interface. FIG. 4 illustrates yet another embodiment wireless network 400 adapted to communicate wireless transmissions spanning portions of both the primary and complementary bands. As shown, the wireless network 400 comprises user equipments (UEs) 430, 440 that are interconnected via an air interface 434. The air interface 434 is adapted to carry a wireless transmission 490 that spans portions of both the primary band and the complementary band. Those of ordinary skill in the art will appreciate that the air interfaces 213, 312, 323, and 434 represent a few of the wireless link types that may be adapted to transport embodiment wireless transmissions spanning both the primary and complementary bands. For instance, wireless backhaul interfaces extending between network access points may be adapted to transport wireless transmissions spanning both the primary and complementary bands.

Figure 5:
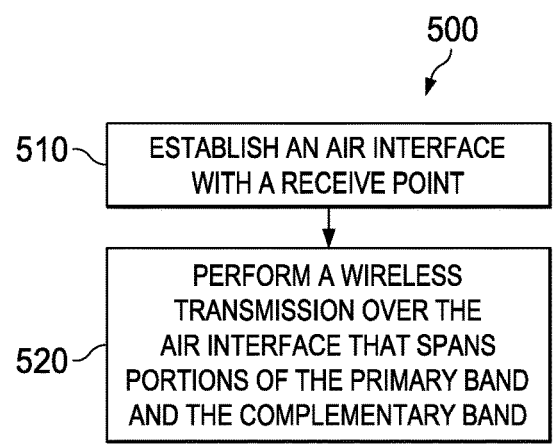
FIG. 5 illustrates a flowchart of an embodiment method for performing a wireless transmission over portions of both the primary and complementary bands.

Aspects of this disclosure provide methods for communicating wireless transmissions that span both the primary and complementary bands. FIG. 5 illustrates an embodiment method 500 for performing a wireless transmission spanning portions of both the primary and complementary bands, as might be performed by a transmit point. As shown, the embodiment method 500 begins at step 510, wherein the transmit point establishes an air interface with a receive point. As used herein, the term "transmit point" refers to any device adapted to emit a wireless transmission (e.g., a base station, relay station, mobile station, etc.), and the term "receive point" refers to any device adapted to receive a wireless transmission, e.g., a base station, relay station, mobile station, etc.

The air interface may be established via a link establishment protocol. In an embodiment, the air interface is at least partially established in accordance with software defined radio (SDR) control signaling instructions. The SDR control signaling instructions may be communicated from the transmit point to the receive point, from the receive point to the transmit point, or to the transmit/receive point by some third party, e.g., a controller, etc. In one embodiment, the air interface is dynamically established in accordance with SDR signaling instructions to transport traffic over the primary band using a first set of parameters, and to transport traffic over the complementary band using a second set of parameters. The second set of parameters may be different than the first set of parameters. For example, the SDR instructions may specify that traffic is to be transported in different waveforms over the respective primary and complementary bands. As another example, the SDR instructions may specify that traffic is to be transported in different frame formats over the respective primary and complementary bands.

Once the air interface is established, the method 500 proceeds to step 520, where the transmit point performs a wireless transmission over the air interface that spans portions of both the primary band and the complementary band. In an embodiment, the wireless transmission multiplexes a single traffic flow over the primary band and the complementary band. The portions of the traffic flow transported over the respective primary and complementary bands may be mutually exclusive such that data carried in one portion is excluded from the other, and vice versa. Alternatively, the portions of the traffic flow transported over the respective primary and complementary bands may share at least some common such that there is at least some degree of redundancy between the respective portions of the traffic flow. As yet another alternative, one of the portions of the traffic flow may carry information bits corresponding to data (e.g., a media stream, etc.) in the traffic flow, while the other portion of the traffic flow may carry parity bits corresponding to those information bits.

Figure 6:
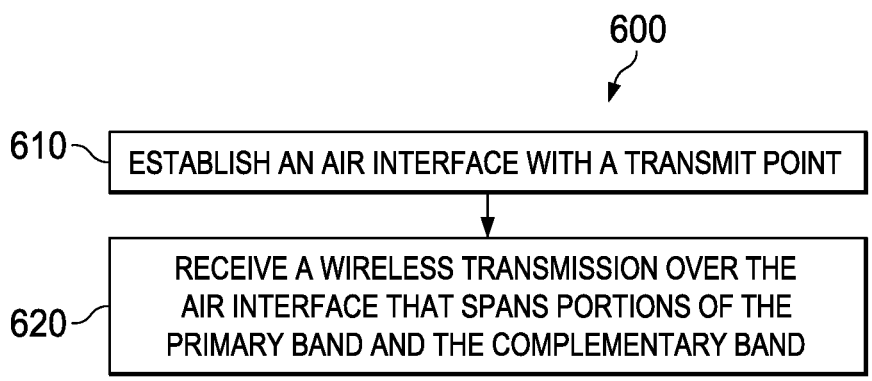
FIG. 6 illustrates a flowchart of an embodiment method for receiving a wireless transmission over portions of both the primary and complementary bands.

FIG. 6 illustrates an embodiment method 600 for receiving a wireless transmission spanning portions of both the primary band and the complementary band, as might be performed by a receive point. As shown, the embodiment method 600 begins at step 610, where the receive point establishes an air interface with a transmit point. Next, the method 600 proceeds to step 620, where the receive point receives a wireless transmission over the air interfaces that spans portions of both the primary band and the complementary band. The wireless transmission communicated in step 620 may be similar to the wireless transmission communicated in step 520.

Figure 7:
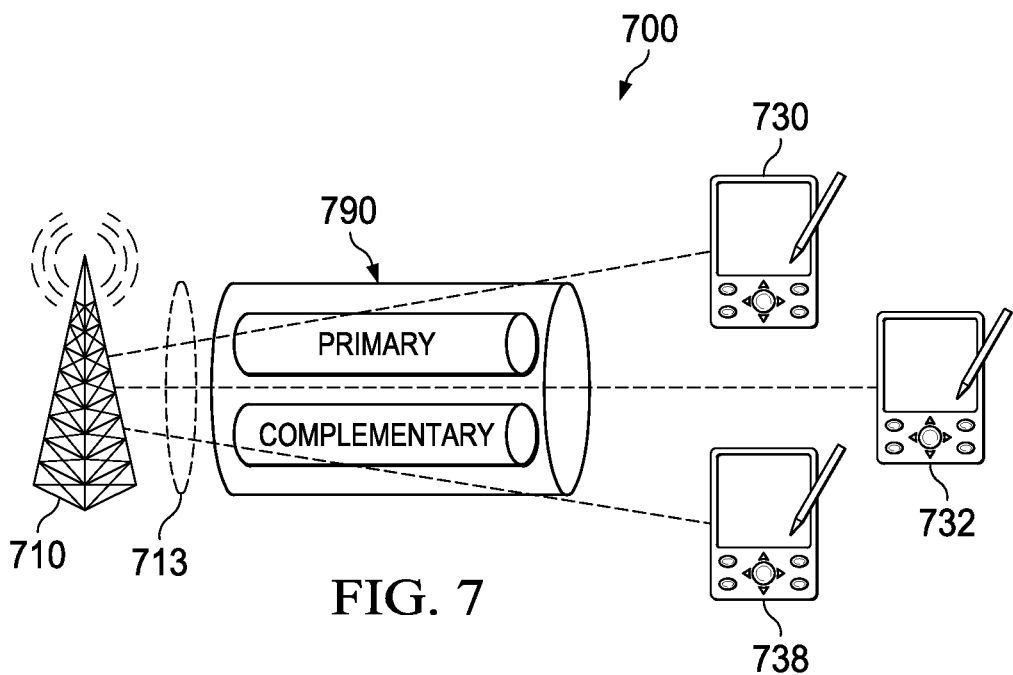
FIG. 7 illustrates a diagram of another embodiment wireless network adapted to transport wireless transmissions spanning portions of both the primary and complementary spectrums over an adaptable air interface.

In some embodiments, a unified air interface extends from a transmit point to multiple receive points. FIG. 7 illustrates an embodiment wireless network 700 adapted for communicating wireless transmissions spanning portions of both the primary and complementary spectrums. As shown, the wireless network 700 includes a transmit point 710 and a plurality of receive points 730-738. A unified air interface 713 is established between the transmit point 710 and the plurality of receive points 730-738. The unified air interface 713 is adapted to carry a wireless transmission 790 that spans at least a portion of the primary band and a portion of the complementary band. In some embodiments, portions of the wireless transmission 790 spanning different bands are communicated to different subsets of the receive points 730-738. The subsets of receive points may include at least one common receive point, e.g., a receive point that receives portions of the signal communicated over both bands. For example, a portion of the wireless transmission 790 spanning the primary band may be communicated to a subset of receive points that includes the receive point 730 and the receive point 732, while a portion of the wireless transmission 790 spanning the complementary band may be communicated to a subset of receive points that includes the receive point 732 and the receive point 738. In such an example, the receive point 732 would receive portions of the wireless transmission 790 spanning both the primary and complementary bands. Alternatively, the subsets of receive points may be mutually exclusive. For example, a portion of the wireless transmission 790 spanning the primary band may be communicated to a subset of receive points that includes the receive point 730 and the receive point 732, while a portion of the wireless transmission 790 spanning the complementary band may be communicated to the receive point 738.

In some embodiments, wireless networks may create pools of spectrum (licensed and unlicensed), and route traffic through the pools in accordance with the capacity and reliability of the network. The traffic in the licensed and unlicensed pools can be sent using different waveforms selected in accordance with the characteristics of the frequency bands and the projected traffic in each band.

The routing may be done with the recognition that the unlicensed spectrum may be less reliable than the licensed spectrum. For example, the unlicensed spectrum may include interference caused by appliances such as microwave ovens. As another example, the unlicensed spectrum may include intra-RAT interference from subscribers using 5G radio access technologies and/or inter-RAT interference from subscriber using different radio access technologies, e.g., Wi-Fi, etc.

Aspects of this disclosure provide systems and methods for performing wireless transmission spanning both licensed and unlicensed spectrum bands via a unified air interface (AI), such as a next generation or 5th generation air interface. Aspects of this disclosure may increase the overall system capacity, while also satisfying application-specific quality of service (QoS) requirements. Aspects of this disclosure extend wireless networks into unlicensed spectrum to improve network capacity. Aspects of this disclosure provide dynamic switching techniques between licensed and unlicensed spectrum; flexible cross-spectrum load balancing; minimized interference over licensed spectrum; and a reduction in demands for licensed spectrum. The licensed spectrum, also referred to as the primary band and/or core band/spectrum, may be used for high priority traffic and traffic with deterministic QoS requirements. It may serve as fallback spectrum (e.g., on an as needed basis) for traffic having statistical QoS requirements. The unlicensed spectrum, also referred to as the complementary band and/or supplementary band/spectrum, may be used for traffic offloading, and in some embodiments may be used for best-effort traffic and traffic with statistical QoS requirements.

Figure 8:
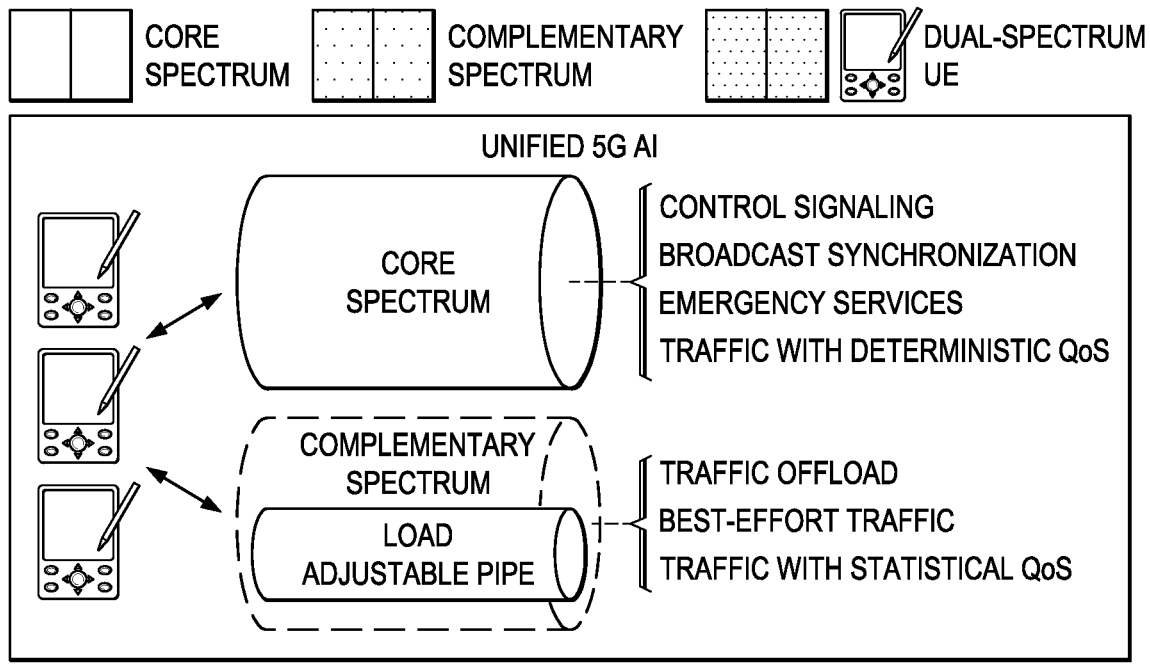
FIG. 8 illustrates a diagram of an embodiment unified air interface for supporting wireless transmissions spanning both the primary and complementary bands.

FIG. 8 illustrates an embodiment unified air interface for supporting wireless transmissions spanning both the primary and complementary bands. The primary band may be used for higher priority traffic, such as control signaling, emergency services, security, network access, broadcasts, synchronization channels, and traffic with deterministic QoS requirements. The unlicensed spectrum can be used opportunistically for traffic offloading purposes, and for best-effort (delay-tolerant) traffic (e.g. content download such as movies, pictures and music), as well as traffic with statistical QoS requirements. Network elements can dynamically switch traffic between the primary and complementary band to satisfy traffic-type and/or application-specific QoS requirements. This provides for a load-aware spectrum expansion/retraction.

In an embodiment, the complementary spectrum is used for a variety of tasks such as data offloading traffic from the primary band, and for load-aware demand-based adaptive spectrum expansion-retraction. It should be noted that because different spectrum bands are being used, different Air Interfaces (AIs) can be used for the primary and complementary bands. Alternatively, the same air interface can be used to carry transmissions spanning both the primary and complementary bands. In an embodiment, a spectrum type dependent SoftAI provides different transmission parameters (e.g., physical layer (PHY) designs) for the primary band and complementary band. This may allow for different waveforms, different access schemes, frame structure, channelization, etc. A virtual resource association (V-RA) based joint radio resource management (RRM) scheme can be employed to determine the demand for unlicensed spectrum considering transmit point (TP) cooperation and UE cooperation. A key performance indicator (KPI) monitoring mechanism for licensed spectrum fall back operation can be added to ensure QoS requirements are met.

Figure 9:
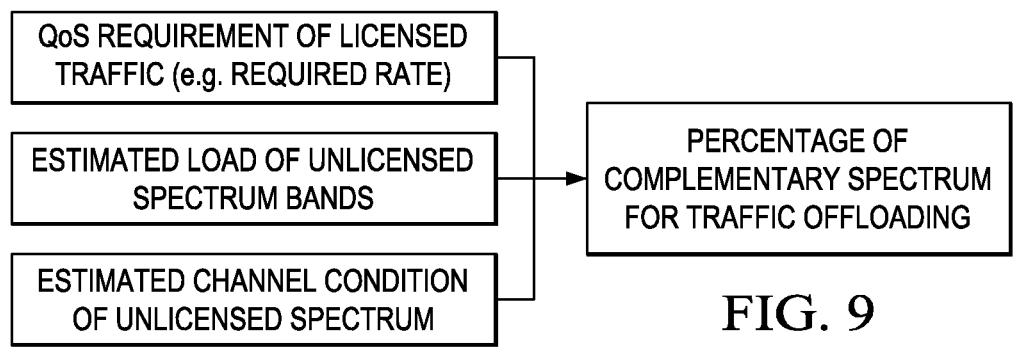
FIG. 9 illustrates a block diagram of an embodiment algorithm for determining a percentage of an extended spectrum over which to offload traffic.

FIG. 9 illustrates a block diagram of an embodiment algorithm for determining a percentage of an extended spectrum over which to offload traffic. The percentage of complementary band used for licensed traffic offloading can be flexibly and dynamically adjusted for the sake of fairness, e.g., in order to reduce the impact on other co-existing systems based on factors such as average traffic load in the unlicensed bands, channel conditions in the licensed and unlicensed spectrum, and licensed traffic QoS requirements such as minimum rate, delay sensitivity, priority, and others.

Spectrum sensing can be used to identify unused portions of the unlicensed spectrum to be opportunistically used for traffic offloading. OFDM is the most commonly used multicarrier waveform, but it is known to suffer from high out-of-band side lobes of its power spectral density. This may cause adjacent channel interference problems for coexisting systems and require the usage of guard bands. Alternatively, dynamic access to the complementary band may require the use of more spectrally contained and scalable baseband waveforms.

Filtering can be used to reduce the out-of-band emissions of OFDM. Filtered-OFDM (F-OFDM) with adaptive filters dynamically designed for specific frequency fragments can be a more spectrally efficient and scalable waveform for dynamically accessing non-contiguous fragments of the unlicensed spectrum.

OFDM/OQAM is a filter bank multi-carrier (FBMC) waveform which is more spectrally contained than OFDM waveform (no need for guard band or cyclic prefix) and also offers more flexibility in dynamic spectrum sharing environments such as the unlicensed spectrum and may offer better performance than F-OFDM at the cost of more complexity and higher latency.

Aspects of this disclosure provide a spectrum-type dependent multicarrier system that combines the use of a proven multicarrier waveform such as OFDM in the primary band and/or a waveform that is more suitable for dynamic spectrum sharing environments such as F-OFDM or FBMC waveforms in the complementary band.

Figure 10:
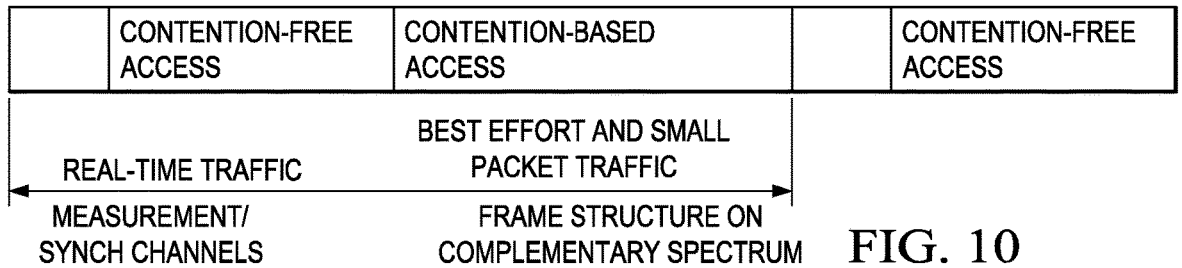
FIG. 10 illustrates a diagram of an embodiment frame structure.

Spectrum access in the extended unlicensed spectrum may be required to abide by some regulations in certain regions such as listen-before-talk (LBT) regulations. An adaptive and flexible frame structure in the complementary band can accommodate regulatory restrictions such as LBT mechanism as well as allow for transmission of measurement and synchronization channels. In one embodiment the frame structure in the unlicensed spectrum where the time duration for contention-free and contention-based access can be adjusted according to periodic channel sensing results as shown in FIG. 10.

Scheduled grant-based access may be used on the primary band, while contention-based access may be used on the complementary band. Using contention based access on the complementary band may allow the spectrum to be shared with co-existing systems. In an embodiment, two contention-levels can be defined. The first is an inter-Radio Access Technology (RAT) contention, while the second is an Intra-RAT contention. In an Inter-RAT contention, contention is between different radio access technologies using the complementary band (e.g. between 5G RAT and other RATs). In an Intra-RAT contention, contention is between similar technology entities (e.g. 5G network entities with best-effort traffic from the same operator or belonging to different operators).

Figure 11:
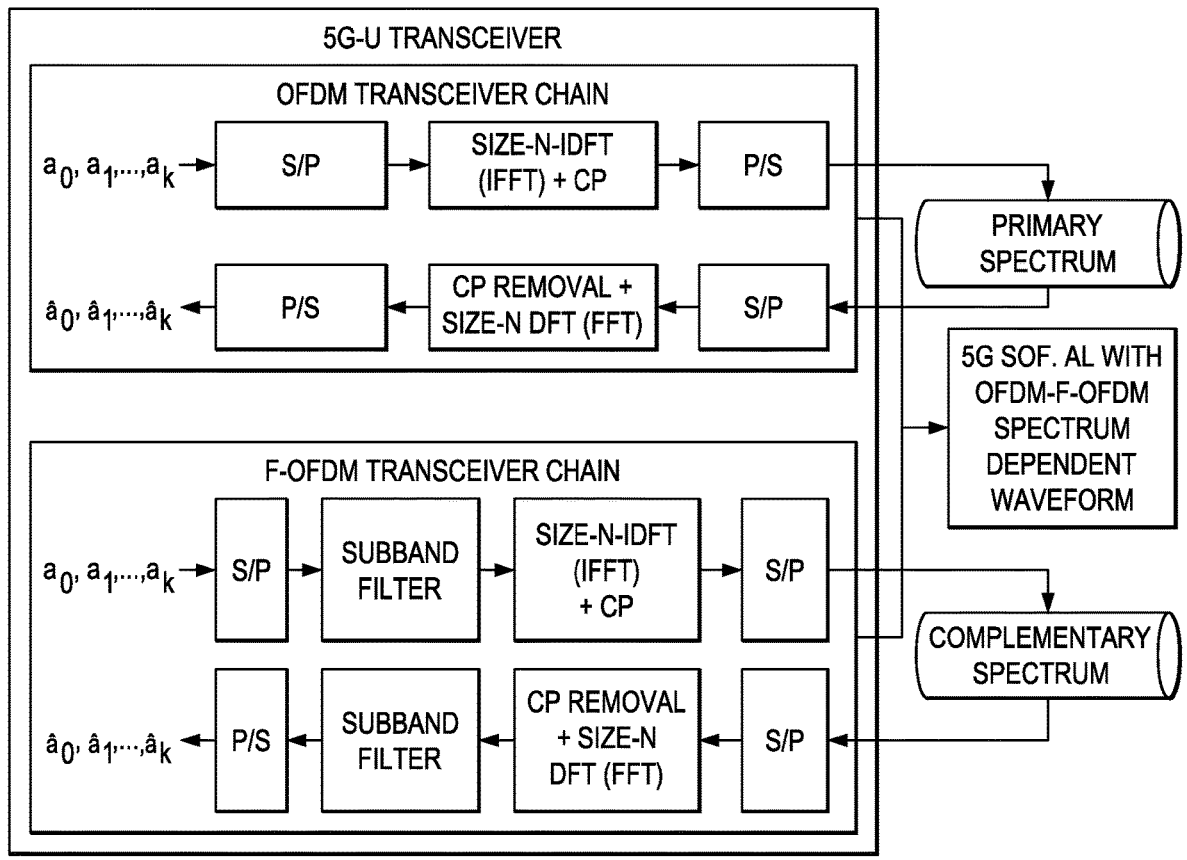
FIG. 11. Illustrates a block diagram of an embodiment transceiver.

FIG. 11 illustrates an embodiment 5G transceiver adapted to communicate wireless transmissions over the primary and complementary spectrums. In this example, the 5G transceiver includes an OFDM transceiver chain adapted to transmit and receive wireless signals over the primary spectrum, and an F-OFDM transceiver chain adapted to transmit and receive wireless signals over the complementary spectrum. In an embodiment, a specially designed MAC protocol is used to efficiently use the complementary band and properly handle the two levels of contention on the complementary band. This can allow for some form of LBT random access procedure, a central entity may decide whether 5G RAT should use the complementary band based on the average traffic load on the unlicensed spectrum. When the unlicensed band is sensed to be lightly loaded, the central entity may adaptively increase the probability for 5G RAT to access the unlicensed spectrum and vice versa. Such a central entity can use either scheduled or contention-based access for managing intra-RAT contention.

The centralized controller can be used to select which spectrum is to be used by which UEs depending on application scenario, traffic type, QoS and security requirements. Alternatively, rules and conditions could be pushed to the UE to allow for the UE to participate in the decision process for example through sending of feedback information to the centralized controller such as its awareness of the interference levels on the complementary bands and or the presence of nearby interfering RATs.

In one exemplary scenario, a high QoS data such as voice, operator-specific services or high security data bearers can be transmitted over conventional licensed spectrum to ensure the QoS requirements are met. Meanwhile, Elastic traffic e.g. best effort and delay tolerant data bearers can be transferred over the unlicensed (and less reliable) spectrum. The centralized controller can continuously or periodically measure the QoS being offered over the unlicensed band and dynamically switch UEs and traffic back to licensed spectrum whenever the expected QoS cannot be guaranteed. A fall-back mechanism can be employed to ensure that whenever QoS requirements cannot be met over the unlicensed spectrum, a fall back to the licensed spectrum takes place.

Assume $UE_i$ has periodic traffic with QoS characteristics that are captured by three parameters $(\gamma_i, \delta_i, \varepsilon_i)$, where $\gamma$ is a Packet arrival rate, $\delta$ is a Maximum tolerable jitter (difference between the times of 2 successive packet departures and the time of 2 successive packet arrivals) and $\varepsilon$ is an Acceptable probability of jitter violation.

For UEs with deterministic QoS guarantees, $\varepsilon_i$ equals zero. Since there is no margin for jitter violation in this case, then the centralized controller assigns UEs with deterministic QoS to use the licensed spectrum. In order to achieve efficient usage of spectrum resources, the centralized controller may assign unlicensed spectrum resources for UEs with statistical QoS requirements. Unlicensed spectrum may be unreliable, so its resources are characterized by a certain blocking rate q. The centralized controller can monitor the average blocking rate over the unlicensed spectrum and may based on these characteristics assign the UEs with statistical QoS to use the unlicensed spectrum as long as QoS is within acceptable levels e.g. $q<\varepsilon_i$.

Those skilled in the art will appreciate that existing solutions do not provide a solution that allows for integrated spectrum access method that efficiently utilizes both licensed and unlicensed spectrum bands using a unified air interface while at the same time maximizing the overall system capacity and ensuring QoS constraints for diverse traffic types (e.g. elastic versus inelastic traffic) are met. The above discussed solution can take advantage of application-specific QoS characteristics to efficiently utilize both licensed and unlicensed spectrum in order to enhance the performance of 5G radio access networks.

Figure 12:
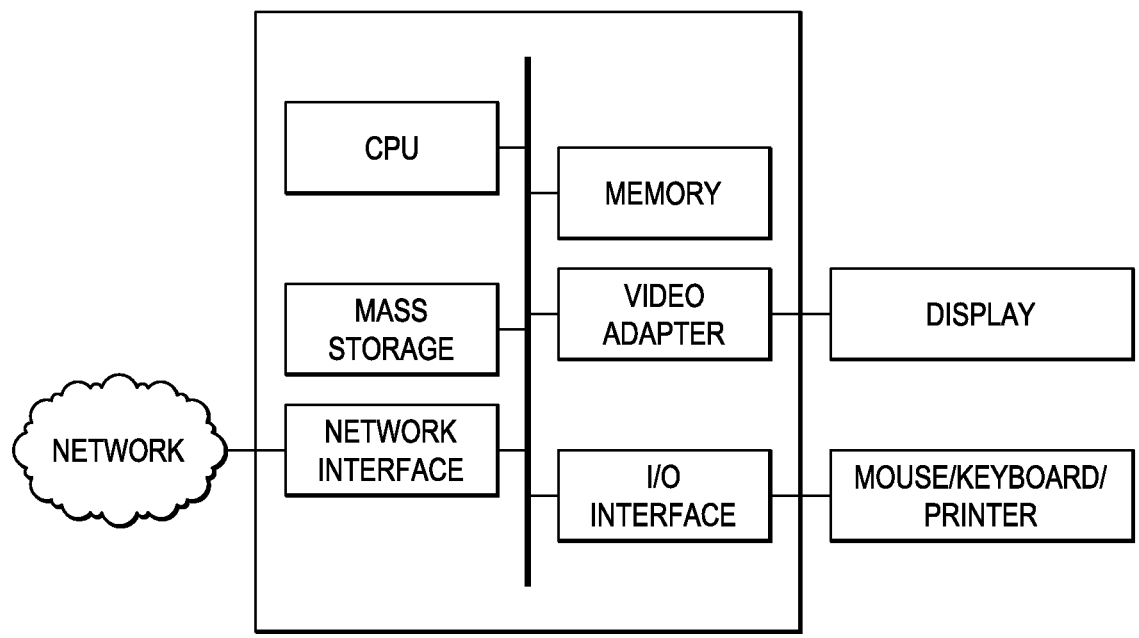
FIG. 12 illustrates a diagram of an embodiment computing platform.

FIG. 12 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 13:
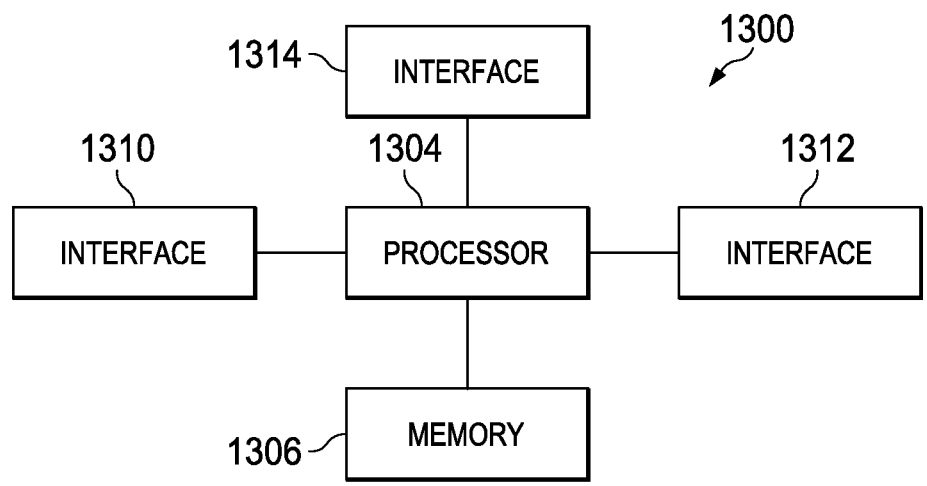
FIG. 13 illustrates a diagram of an embodiment communications device.

FIG. 13 illustrates a block diagram of an embodiment of a communications device 1300, which may be equivalent to one or more devices (e.g., UEs, NBs, etc.) discussed above. The communications device 1300 may include a processor 1304, a memory 1306, and a plurality of interfaces 1310, 1312, 1314, which may (or may not) be arranged as shown in FIG. 13. The processor 1304 may be any component capable of performing computations and/or other processing related tasks, and the memory 1306 may be any component capable of storing programming and/or instructions for the processor 1304. The interfaces 1210, 1212, 1214 may be any component or collection of components that allows the communications device 1300 to communicate using a cellular signal, and may be used to receive and/or transmit information over a cellular connection of a cellular network.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for facilitating wireless communications spanning licensed and unlicensed bands, the method comprising:

selecting, by a controller, configuration parameters for communicating a traffic flow spanning multiple bands over a unified air interface, the selected configuration parameters including a first set of configuration parameters for communicating the traffic flow over a primary band licensed for cellular communications, and a second set of configuration parameters for communicating the traffic flow over a complementary band reserved for unlicensed communications, wherein the first set of configuration parameters is different than the second set of configuration parameters, the unified air interface being a common air interface established between a transmit point and one or more receive points for communication over both the primary band and the complementary band; and prompting the transmit point to perform a wireless transmission of the traffic flow over the unified air interface in accordance with the selected configuration parameters, the unified air interface operating in accordance with a common radio access technology (RAT) for communicating the traffic flow over the primary band and the complementary band and providing a common physical and medium access control (MAC) connection that is shared by a portion of the traffic flow spanning the primary band and a portion of the traffic flow spanning the complementary band, wherein the wireless transmission comprises a first frame communicated over the primary band, and a second frame communicated over the complementary band, wherein the first frame and the second frame overlap in the time domain, wherein the portion of the traffic flow spanning the primary band is communicated via a first waveform in accordance with the first set of configuration parameters, and wherein the portion of the traffic flow spanning the complementary band is communicated via a second waveform different than the first waveform in accordance with the second set of configuration parameters.

2. The method of claim 1, wherein the unified air interface extends from the transmit point to a single receive point.

3. The method of claim 1, wherein the unified air interface extends from the transmit point to a plurality of receive points.

4. The method of claim 3, wherein the portion of the traffic flow spanning the primary band are communicated to a first subset of receive points in the plurality of receive points, and wherein the portion of the traffic flow spanning the complementary band are communicated to a second subset of receive points in the plurality of receive points.

5. The method of claim 1, wherein the complementary band comprises an industrial, scientific and medical (ISM) band.

6. The method of claim 1, wherein the wireless transmission is communicated directly from the transmit point to a receive point in accordance with the same telecommunication protocol.

7. The method of claim 1, the second frame having a different frame structure than the first frame.

8. The method of claim 7, wherein the first frame and the second frame comprise different channel structures such that at least one channel in the first frame has a different size, placement, or orientation than a corresponding channel in the second frame.

9. The method of claim 1, wherein the wireless transmission spans grant-based resources in the primary band, and grant-less resource in the complementary band, the grant-based resources of the primary band being accessed in accordance with a scheduling-based access scheme, and the grant-less resources of the complementary band being accessed in accordance with a contention-based or random access scheme.

10. The method of claim 1, wherein the first waveform comprises an orthogonal frequency-division multiplexing (OFDM) waveform, and wherein the second waveform comprises a filter bank multi-carrier (FBMC) waveform.

11. The method of claim 1, wherein the first waveform comprises an orthogonal frequency-division multiplexing (OFDM) waveform, and wherein the second waveform comprises a filtered-OFDM (F-OFDM) waveform.

12. The method of claim 1, wherein the wireless transmission carries a first portion of the traffic flow over the primary band, and a second portion of the traffic flow over the complementary band, and wherein the second portion of the traffic flow includes at least some data that is excluded from the first portion of the traffic flow, or vice-versa.

13. The method of claim 1, wherein the transmit point comprises a base station, a relay station, or a user equipment.

14. The method of claim 1, wherein the prompting the transmit point to perform the wireless transmission of the traffic flow spanning both the primary band and the complementary band using the selected configuration parameters in accordance with the unified air interface comprises:
sending a software defined radio (SDR) signaling instruction to the transmit point, the SDR signaling instruction prompting the transmit point to dynamically adapt one or more air interface configuration parameters for carrying the wireless transmission of the traffic flow over the primary band in accordance with the first set of configuration parameters, and to dynamically adapt one or more air interface configuration parameters for carrying the wireless transmission of the traffic flow over the complementary band in accordance with the second set of configuration parameters.

15. The method of claim 1, the wireless transmission being transmitted over the unified air interface operating in accordance with the common RAT of a transceiver of the transmit point.

16. The method of claim 1, further comprising:
dynamically switching a transmission of a third portion of the traffic flow from transmitting the third portion over the primary band to transmitting the third portion over the complementary band, or from transmitting the third portion over the complementary band to transmitting the third portion over the primary band.

17. A controller comprising:
a processor; and
a non-transitory computer readable storage medium storing programming for execution by the processor, the programming including instructions to:
select configuration parameters for communicating a traffic flow spanning multiple bands over a unified air interface, the selected configuration parameters including a first set of configuration parameters for communicating the traffic flow over a primary band licensed for cellular communications, and a second set of configuration parameters for communicating the traffic flow over a complementary band reserved for unlicensed communications, the unified air interface being a common air interface established between a transmit point and one or more receive points for communication over both the primary band and the complementary band; and
prompt the transmit point to perform a wireless transmission of the traffic flow over the unified air interface spanning both the primary band and the complementary band in accordance with the selected configuration parameters, the unified air interface operating in accordance with a common radio access technology (RAT) for communicating the traffic flow over the primary band and the complementary band and providing a common physical and medium access control (MAC) connection that is shared by a portion of the traffic flow spanning the primary band and a portion of the traffic flow spanning the complementary band,
wherein the wireless transmission comprises a first frame communicated over the primary band, and a second frame communicated over the complementary band,
wherein the first frame and the second frame overlap in the time domain,
wherein the portion of the traffic flow spanning the primary band is communicated via a first waveform in accordance with the first set of configuration parameters, and
wherein the portion of the traffic flow spanning the complementary band is communicated via a second waveform different than the first waveform in accordance with the second set of configuration parameters.

18. A method for transmitting a signal spanning licensed and unlicensed bands, the method comprising:
establishing a unified air interface between a transmit point and one or more receive points, the unified air interface being a common air interface used for communication between the transmit point and the one or more receive points over both a primary band licensed for cellular operations and a complementary band reserved for unlicensed communications; and
performing, by the transmit point, a wireless transmission of a traffic flow over the unified air interface spanning at least a portion of the primary band and at least a portion of the complementary band, the unified air interface operating in accordance with a common radio access technology (RAT) for communicating the traffic flow over the primary band and the complementary band and providing a common physical and medium access control (MAC) connection that is shared by a portion of the traffic flow spanning the primary band and a portion of the traffic flow spanning the complementary band,
wherein the wireless transmission comprises a first frame communicated over the primary band, and a second frame communicated over the complementary band,
wherein the first frame and the second frame overlap in the time domain, wherein the portion of the traffic flow spanning the primary band is communicated in accordance with different configuration parameters than the portion of the traffic flow spanning the complementary band, and wherein the portion of the traffic flow spanning the primary band is communicated via a first waveform, and the portion of the traffic flow spanning the complementary band is communicated via a second waveform that is different than the first waveform.

19. The method of claim 18, the second frame having a different frame structure than the first frame.

20. The method of claim 19, wherein the first frame and the second frame comprise different channel structures such that at least one channel in the first frame has a different size, placement, or orientation than a corresponding channel in the second frame.

21. The method of claim 18, wherein performing the wireless transmission of the traffic flow comprises:
   transmitting the first waveform over the primary band; and
   transmitting the second waveform over the complementary band, the second waveform being different than the first waveform.

22. The method of claim 21, wherein the first waveform comprises an orthogonal frequency-division multiplexing (OFDM) waveform, and wherein the second waveform comprises a filter bank multi-carrier (FBMC) waveform or a filtered-OFDM (F-OFDM) waveform.

23. The method of claim 18, wherein a receive point of the one or more receive points comprises a base station, a relay station, or a user equipment.

24. A transmit point comprising:
   a processor; and
   a non-transitory computer readable storage medium storing programming for execution by the processor, the programming including instructions to:
      establish a unified air interface between the transmit point and one or more receive points, the unified air interface being a common air interface used for communication between the transmit point and the one or more receive points over both a primary band licensed for cellular operations and a complementary band reserved for unlicensed communications; and
      perform a wireless transmission of a traffic flow over the unified air interface spanning at least a portion of the primary band and at least a portion of the complementary band, the unified air interface operating in accordance with a common radio access technology (RAT) for communicating the traffic flow over the primary band and the complementary band and providing a common physical and medium access control (MAC) connection that is shared by a portion of the traffic flow spanning the primary band and a portion of the traffic flow spanning the complementary band,
      wherein the wireless transmission comprises a first frame communicated over the primary band, and a second frame communicated over the complementary band,
      wherein the first frame and the second frame overlap in the time domain,
      wherein the portion of the traffic flow spanning the primary band is communicated in accordance with different configuration parameters than the portion of the traffic flow spanning the complementary band, and
      wherein the portion of the traffic flow spanning the primary band is communicated via a first waveform, and the portion of the traffic flow spanning the complementary band is communicated via a second waveform that is different than the first waveform.

25. A method for operating a multi-spectrum receiver, the method comprising:
   establishing a unified air interface between a transmit point and a receive point, the unified air interface being a common air interface used for communication between the transmit point and the receive point over both a primary band licensed for cellular operations and a complementary band reserved for unlicensed communications; and
   receiving, by the receive point, a wireless transmission of a traffic flow over the unified air interface spanning at least the primary band and the complementary band, the unified air interface operating in accordance with a common radio access technology (RAT) for communicating the traffic flow over the primary band and the complementary band and providing a common physical and medium access control (MAC) connection that is shared by a portion of the traffic flow spanning the primary band and a portion of the traffic flow spanning the complementary band,
   wherein the wireless transmission comprises a first frame communicated over the primary band, and a second frame communicated over the complementary band,
   wherein the first frame and the second frame overlap in the time domain, and
   wherein the portion of the traffic flow spanning the primary band is received in accordance with different configuration parameters than the portion of the traffic flow spanning the complementary band, and
   wherein the portion of the traffic flow spanning the primary band is communicated via a first waveform, and the portion of the traffic flow spanning the complementary band is communicated via a second waveform that is different than the first waveform.

26. The method of claim 25, the second frame having a different frame structure than the first frame.

27. The method of claim 26, wherein the first frame and the second frame comprise different channel structures such that at least one channel in the first frame has a different size, placement, or orientation than a corresponding channel in the second frame.

28. The method of claim 25, wherein receiving the wireless transmission of the traffic flow comprises:
   receiving the first waveform over the primary band; and
   receiving the second waveform over the complementary band, the second waveform being different than the first waveform.

29. The method of claim 28, wherein the first waveform comprises an orthogonal frequency-division multiplexing (OFDM) waveform, and wherein the second waveform comprises a filter bank multi-carrier (FBMC) waveform or a filtered-OFDM (F-OFDM) waveform.

30. The method of claim 25, wherein the receive point comprises a base station, a relay station, or a user equipment.

31. A receive point comprising:
   a processor; and
   a non-transitory computer readable storage medium storing programming for execution by the processor, the programming including instructions to:
      establish a unified air interface between a transmit point and the receive point, the unified air interface being a common air interface used for communication between the transmit point and the receive point over both a primary band licensed for cellular operations and a complementary band reserved for unlicensed communications; and receive a wireless transmission of a traffic flow over the unified air interface spanning at least a portion of the primary band and at least a portion of the complementary band, the unified air interface operating in accordance with a common radio access technology (RAT) for communicating the traffic flow over the primary band and the complementary band and providing a common physical and medium access control (MAC) connection that is shared by a portion of the traffic flow spanning the primary band and a portion of the traffic flow spanning the complementary band, wherein the wireless transmission comprises a first frame communicated over the primary band, and a second frame communicated over the complementary band, wherein the first frame and the second frame overlap in the time domain, wherein the portion of the traffic flow spanning the primary band is received in accordance with different configuration parameters than the portion of the traffic flow spanning the complementary band, and wherein the portion of the traffic flow spanning the primary band is communicated via a first waveform, and the portion of the traffic flow spanning the complementary band is communicated via a second waveform that is different than the first waveform.

\* \* \* \* \*